United States Patent
Oba et al.

(10) Patent No.: US 8,855,306 B2
(45) Date of Patent: Oct. 7, 2014

(54) NODE DISTRIBUTED WITH GROUP KEY AND GROUP KEY UPDATING

(75) Inventors: Yoshihiro Oba, Kanagawa (JP); Yasuyuki Tanaka, Kanagawa (JP); Shinji Yamanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 97 days.

(21) Appl. No.: 13/332,998

(22) Filed: Dec. 21, 2011

(65) Prior Publication Data

US 2012/0243683 A1 Sep. 27, 2012

(30) Foreign Application Priority Data

Mar. 25, 2011 (JP) ................................. 2011-068008

(51) Int. Cl.
*H04K 1/00* (2006.01)
*H04L 9/08* (2006.01)
(52) U.S. Cl.
CPC .................................. *H04L 9/0836* (2013.01)
USPC ............. 380/255; 380/44; 380/227; 380/281; 709/225; 713/153; 713/168
(58) Field of Classification Search
USPC ............ 713/153, 168; 380/44, 255, 227, 281; 709/225
See application file for complete search history.

(56) References Cited

U.S. PATENT DOCUMENTS

| | | | |
|---|---|---|---|
| 6,915,434 B1 * | 7/2005 | Kuroda et al. | 713/193 |
| 8,205,085 B2 * | 6/2012 | Yao | 713/171 |
| 2002/0176576 A1 * | 11/2002 | Abe et al. | 380/227 |
| 2003/0016826 A1 * | 1/2003 | Asano et al. | 380/277 |
| 2003/0159033 A1 * | 8/2003 | Ishiguro | 713/156 |
| 2005/0213765 A1 | 9/2005 | Mihaljevic et al. | |
| 2005/0216731 A1 * | 9/2005 | Saito et al. | 713/153 |
| 2005/0283530 A1 * | 12/2005 | O'Neal et al. | 709/224 |

(Continued)

FOREIGN PATENT DOCUMENTS

| | | |
|---|---|---|
| JP | 2000-181803 A | 6/2000 |
| JP | 2004-254178 A | 9/2004 |

(Continued)

OTHER PUBLICATIONS

T. Winter, et al., "RPL: IPv6 Routing Protocol for Low power and Lossy Networks," Internet-Draft, draft-ietf-roll-rpl-15, Nov. 6, 2010, 26 pages.

(Continued)

Primary Examiner — Thuong Nguyen
(74) Attorney, Agent, or Firm — Oblon, Spivak, McClelland, Maier & Neustadt, L.L.P.

(57) ABSTRACT

According to one embodiment, a node that is a root node of a network forming a directed acyclic graph topology, which is composed of plural nodes including the node serving as the root node and having a parent-child relationship among nodes of adjacent hierarchies, includes a generating unit, an encrypting unit, and a transmitting unit. The generating unit generates a group key, and a list indicating a first node to which a distribution of the group key is inhibited. The encrypting unit encrypts the group key so as to be capable of being decrypted by a first child node other than the first node out of the child nodes of the root node. The transmitting unit transmits a first message, including an encrypted group key, which is the group key that is encrypted with respect to the first child node, and the list.

12 Claims, 6 Drawing Sheets

(56) References Cited

U.S. PATENT DOCUMENTS

2009/0077326 A1* 3/2009 Motohashi .................. 711/153
2009/0198816 A1* 8/2009 Bannister et al. ............ 709/225
2011/0305333 A1* 12/2011 Jacobson et al. .............. 380/44
2012/0210140 A1* 8/2012 Takashima .................. 713/189

FOREIGN PATENT DOCUMENTS

| | | |
|---|---|---|
| JP | 2004-349733 A | 12/2004 |
| JP | 2007-174083 A | 7/2007 |
| JP | 2009-10745 A | 1/2009 |
| JP | 2010-108520 | 5/2010 |

OTHER PUBLICATIONS

Dalit Naor, et al., "Revocation and Tracing Schemes for Stateless Receivers," In Advances in Cryptology-CRYPT 2011, Springer-Verlag Inc. LNCS 2139, 2001, 22 pages.

Office Action issued Mar. 5, 2013, in Japanese Patent Application No. 2011-068008 with English translation.

Chinese Office Action issued May 26, 2014, in Chinese Patent Application No. 201110439441.8 (with English Translation).

* cited by examiner

NODE DISTRIBUTED WITH GROUP KEY AND GROUP KEY UPDATING

CROSS-REFERENCE TO RELATED APPLICATION

This application is based upon and claims the benefit of priority from Japanese Patent Application No. 2011-068008, filed on Mar. 25, 2011; the entire contents of which are incorporated herein by reference.

FIELD

Embodiments described herein relate generally to a node and a group key updating method.

BACKGROUND

There has conventionally been a technique of distributing a group key to each node in a network forming a directed acyclic graph topology, which is composed of plural nodes including one node serving as a root node and having a parent-child relationship among nodes of adjacent hierarchies. The group key is used for authentification in order to confirm whether a communication to each node connected to the network is possible or not. In this technique, the group key is distributed to each node from the root node (edge router) as being encrypted. In this case, a group key distribution message containing the encrypted group key is transferred to low-order nodes from high-order node. An encryption key used for the encryption upon the distribution of the group key is created when a network access authentification, executed between each node and the root node when each node joins the group, is successful. The group key is updated every time the node connected to the network is changed, and a group key update message containing the group key, which is encrypted with respect to each node that can be communicated in the network, is distributed as in the group key distribution message.

DETAILED DESCRIPTION

In general, according to one embodiment, a node that is a root node of a network forming a directed acyclic graph topology, which is composed of plural nodes including node serving as the root node and having a parent-child relationship among nodes of adjacent hierarchies, includes a generating unit, an encrypting unit, and a transmitting unit. The generating unit generates a group key, and a list indicating a first node to which a distribution of the group key is inhibited. The encrypting unit encrypts the group key so as to be capable of being decrypted by a first child node other than the first node out of the child nodes of the root node. The transmitting unit transmits a first message, including an encrypted group key, which is the group key that is encrypted with respect to the first child node, and the list.

A method of updating a node and a group key according to a present embodiment will be described in detail with reference to the attached drawings.

First Embodiment

Figure 1:
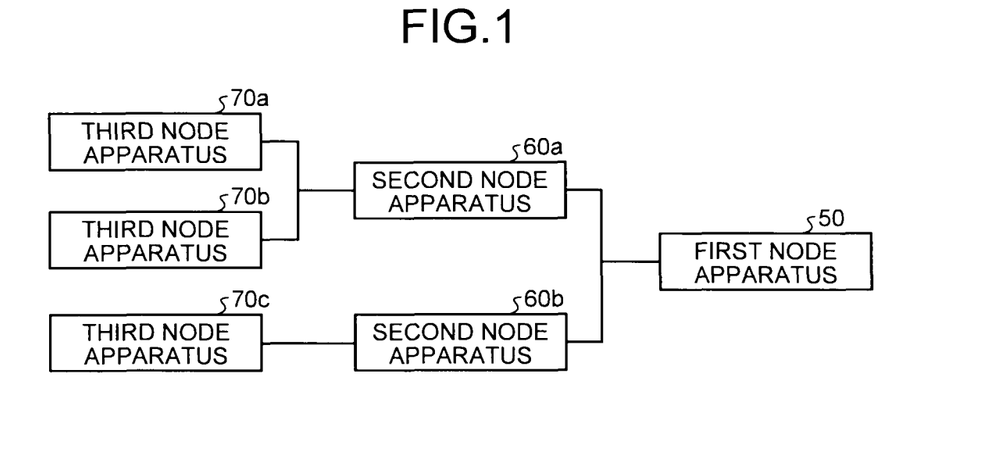
FIG. 1 is a diagram illustrating a network according to one embodiment.

It is supposed that a network forming a directed acyclic graph topology, which is composed of plural nodes including one node serving as a root node and having a parent-child relationship between nodes of adjacent hierarchies, according to the present embodiment forms a tree-structured topology. FIG. 1 illustrates a network forming a tree-structured topology according to the present embodiment. The network illustrated in FIG. 1 has three hierarchies, each having a parent-child relationship among nodes of adjacent hierarchies. A first node apparatus 50 serving as a root node is present at the uppermost hierarchy, second node apparatuses 60a and 60b are present at the second hierarchy from the top, and third node apparatuses 70a, 70b, and 70c serving as leaf nodes are present at the lowermost hierarchy. The second node apparatuses 60a and 60b are the child nodes of the first node apparatus 50, the third node apparatuses 70a and 70b are child nodes of the second node apparatus 60a, and the third node apparatus 70c is a child node of the second node apparatus 60b. When it is unnecessary to distinguish the first node apparatus 50, the second node apparatuses 60a and 60b, and the third node apparatuses 70a, 70b, and 70c, these apparatuses are merely referred to as node apparatus. When it is necessary to distinguish the first node apparatus 50 from the node apparatuses other than the first node apparatus 50, the latter apparatuses may sometimes be referred to as non-first node apparatuses. Each node apparatus has assigned thereto node identification information for identifying each node apparatus.

A hardware structure of the node apparatus according to the present embodiment will next be described. The node apparatus has a hardware structure utilizing a general computer, and including a control unit, such as a CPU (Central Processing Unit), that entirely controls the apparatus, a main storage unit, such as a ROM (Read Only Memory) or a RAM (Random Access Memory), that stores various data or various programs, an auxiliary storage unit, such as a HDD (Hard Disk Drive) or a CD (Compact Disk) drive device, that stores various data and various programs, a communication I/F (interface) for controlling communication with an external device, and a bus that interconnects these units. A display unit for displaying information and an operation input unit such as a keyboard or mouse for accepting an input of an instruction of a user may be connected to the node apparatus with wired line or wirelessly. An encryption key used for encryption of a distribution of a group key is assigned to each of the non-first node apparatuses, wherein the auxiliary storage unit of each non-first node apparatus includes the encryption key assigned to it and an encryption key assigned to its child node. On the other hand, the auxiliary storage unit of the first node apparatus 50 stores encryption keys assigned respectively to the second node apparatuses 60a and 60b, which are the child nodes of the first node apparatus 50. Encryption key identification information for identifying the encryption keys is assigned to each of the encryption keys.

Various functions realized by the node apparatus in the hardware structure described above will next be described. The functional structure of the first node apparatus 50 and the functional structure of the non-first node apparatuses are different from each other. Therefore, these structures will separately be described. The functional structure of the first node apparatus 50 will firstly be described with reference to FIG. 2. The first node apparatus 50 includes a communication control unit 51 and a key update control unit 52. The function of the communication control unit 51 is realized by executing, by the communication I/F of the first node apparatus 50 and the CPU of the first node apparatus 50, the various programs stored in the main storage unit and the auxiliary storage unit. The function of the key update control unit 52 is realized by executing, by the CPU of the first node apparatus 50, various programs stored in the main storage unit and the auxiliary storage unit.

Figure 2:
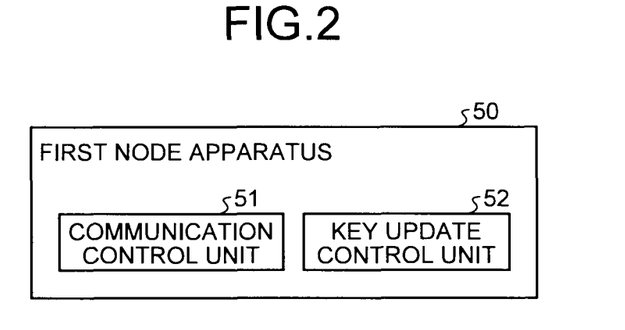
FIG. 2 is a diagram illustrating a functional structure of a first node apparatus.

The communication control unit 51 controls the communication with the non-first node apparatuses, and corresponds to a transmitting unit and a receiving unit. Specifically, the communication control unit 51 transmits a group key update message, which is generated by the later-described key update control unit 52 for the second node apparatuses 60*a* and 60*b* that are the child nodes of the first node apparatus 50, receives a transmission confirmation message, which indicates the reception of the group key update message, from the second node apparatuses 60*a* and 60*b*, or transmits a later-described group key update completion message to all node apparatuses connected to the network.

The key update control unit 52 controls the update of the group key, and corresponds to a generating unit and an encrypting unit. Specifically, the key update control unit 52 creates a new group key and a group key distribution inhibition list, which indicates node identification information of a non-first node apparatus (hereinafter referred to as a distribution inhibition node) that is a target to which the distribution of the group key is inhibited, according to a predetermined updating condition. It is supposed that group key identification information for identifying the group key is assigned to the group key. The predetermined updating condition means that a node apparatus forming the network is changed, for example. The distribution inhibition node is the non-first node apparatus that is pulled out of the network, or a non-first node apparatus that is temporarily or permanently inhibited to use the network according to a contract involved with a use of the network, for example. As for the former distribution inhibition node, the key update control unit 52 periodically or at an optional timing detects the non-first node apparatus connected to the network through the communication control unit 51 so as to detect the non-first node apparatus pulled out of the network as the distribution inhibition node, and acquires the node identification information of the corresponding non-first node apparatus. As for the latter distribution inhibition node, the node identification information of the corresponding distribution inhibition node is stored beforehand in the auxiliary storage unit of the first node apparatus 50, for example, and the key update control unit 52 reads and acquires the corresponding node identification information from the auxiliary storage unit.

The key update control unit 52 creates the group key update message, including the group key that is encrypted so as to be capable of being decrypted by the corresponding child node (hereinafter referred to as an encrypted group key), for the child node, which is not the distribution inhibition node, out of the child nodes of the first node apparatus 50, and transmits the group key update message through the communication control unit 51. Here, the second node apparatuses 60*a* and 60*b*, which are the child nodes of the first node apparatus 50, are not supposed to be the distribution inhibition node. In this case, the key update control unit 52 specifically encrypts a new group key by using the encryption key assigned to the second node apparatus 60*a*, creates a group key update message including the group key that is encrypted (encrypted group key) and the distribution inhibition node list, and transmits the resultant to the second node apparatus 60*a* through the communication control unit 51. Similarly, the key update control unit 52 encrypts a new group key by using the encryption key assigned to the second node apparatus 60*b*, creates a group key update message including the encrypted group key and the distribution inhibition node list, and transmits the resultant to the second node apparatus 60*b* through the communication control unit 51.

Figure 3:
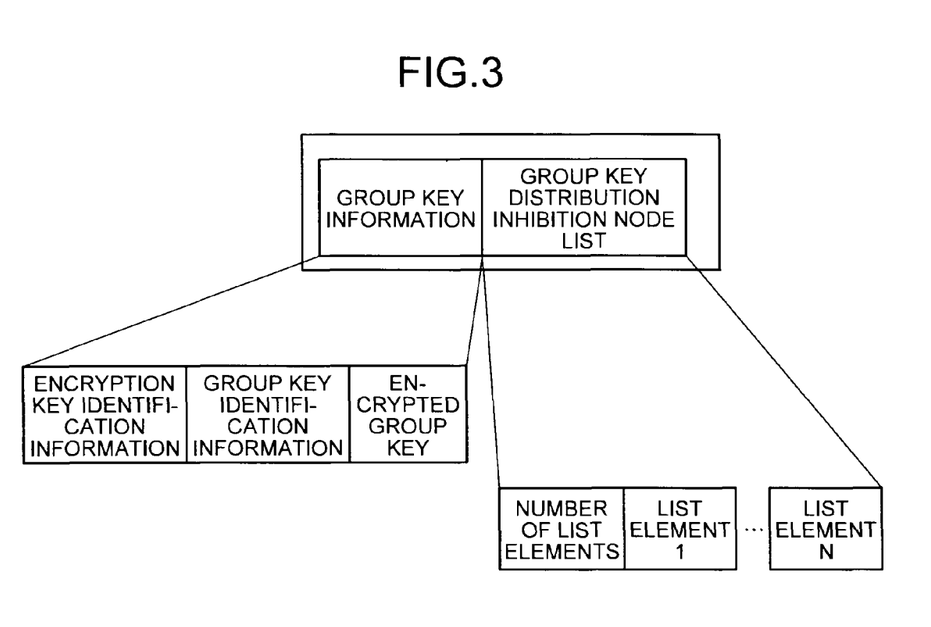
FIG. 3 is a diagram illustrating a data structure of a group key update message.

FIG. 3 is a view illustrating a data structure of the group key update message. The group key update message includes group key information and the distribution inhibition node list. The group key information includes the encrypted group key that is the group key encrypted by using the encryption key, the group key identification information for identifying the group key, and the encryption key identification information for identifying the encrypted key used for encrypting the group key. In the example in FIG. 3, the distribution inhibition node list indicates N node identification information of the distribution inhibition node as list elements, and the number of N of the list elements (list element number). The data structure of the group key update message is not limited to the one illustrated in FIG. 3, so long as it includes at least the encrypted group key and the distribution inhibition node list.

When the communication control unit 51 receives the transmission confirmation message from all child nodes (here, the second node apparatuses 60*a* and 60*b*) to which the group key update message is transmitted, the key update control unit 52 simultaneously transmits the group key update completion message, which indicates that the group key is usable, to all nodes connected to the network through the communication control unit 51 to validate the group key. To validate the group key means that the group key is used for the authentification for confirming whether the communication to the node apparatuses connected to the network is possible or not.

Figure 4:
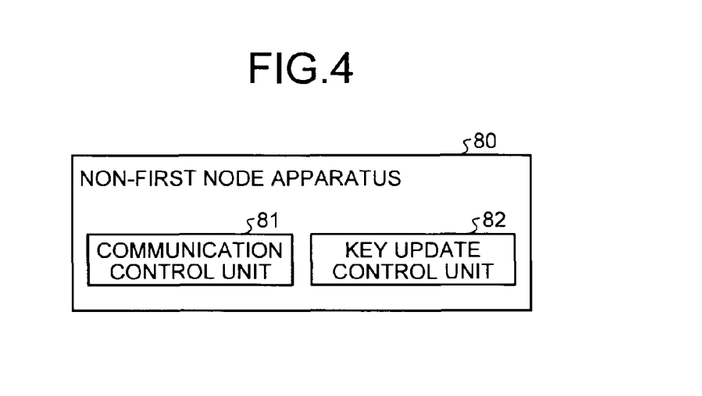
FIG. 4 is a diagram illustrating a functional structure of a non-first node apparatus.

The functional structure of the non-first node apparatus will next be described with reference to FIG. 4. The non-first node apparatus includes a communication control unit 81, and a key update control unit 82. The function of the communication control unit 81 is realized by executing, by the communication I/F of the non-first node apparatus and the CPU of the non-first node apparatus, the various programs stored in the main storage unit and the auxiliary storage unit. The function of the key update control unit 82 is realized by executing, by the CPU of the non-first node apparatus, various programs stored in the main storage unit and the auxiliary storage unit.

The communication control unit 81 controls the communication with a child node or a parent node of the non-first node apparatus, and corresponds to a transmitting unit and a receiving unit. Specifically, the communication control unit 81 receives the group key update message from the parent node of the non-first node apparatus, transmits the group key update message that is generated by the later-described key update control unit 82 for the child node of the non-first node apparatus, receives the transmission confirmation message, indicating the reception of the group key update message, from the child node, transmits the transmission confirmation message to the parent node of the non-first node apparatus after receiving the transmission confirmation message from the child node, or receives the group key update completion message simultaneously transmitted from the first node apparatus 50. When the later-described key update control unit 82 does not create the group key update message after receiving the group key update message from the parent node of the non-first node apparatus, the communication control unit 81 transmits the transmission confirmation message to the parent node of the non-first node apparatus without transmitting the group key update message.

The key update control unit 82 controls the update of the group key, and corresponds to a decrypting unit and an encrypting unit. Specifically, when receiving the group key update message from the own parent node through the communication control unit 81, the key update control unit 82 acquires the encrypted group key and the group key distribution inhibition list included in the group key update message, and decrypts the encrypted key with the use of the encryption key assigned thereto to obtain the group key. When the non-first node apparatus has the child node, the key update control unit 82 of the corresponding non-first node apparatus creates the group key update message including the group key that is encrypted so as to be capable of being decrypted by the corresponding child node (hereinafter referred to as an encrypted group key), and transmits the resultant to the child node, whose node identification information is not indicated by the group key distribution inhibition list, out of the child nodes, through the communication control unit 81. Specifically, the key update control unit 82 encrypts the group key by using the encryption key assigned to the child node, creates the group key update message including the encrypted group key, which is the group key that is encrypted, and the distribution inhibition node list included in the received group key update message, and transmits the resultant through the communication control unit 81. When the non-first node apparatus does not have child nodes, or when all child nodes are the distribution inhibition nodes even if it has the child nodes, i.e., when all of the node identification information of the child nodes are indicated by the group key distribution inhibition list, the key update control unit 82 does not create the node group key update message.

When receiving the group key update completion message from the first node apparatus 50 through the communication control unit 81, the key update control unit 82 validates the group key that is obtained as being decrypted.

Figure 5:
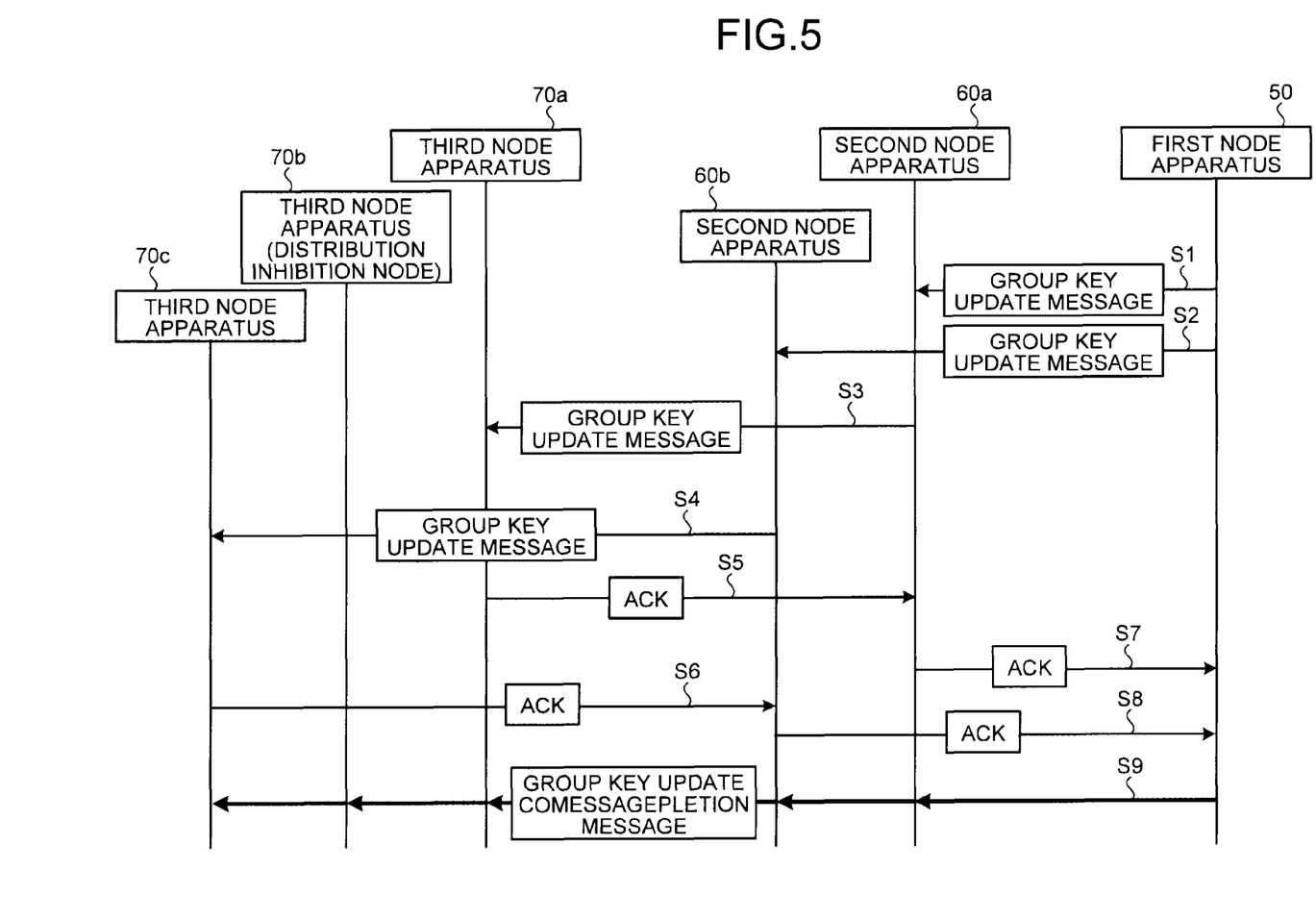
FIG. 5 is a sequence chart illustrating an outline of a group key updating process.

A group key update process for updating the group key in the network according to the present embodiment will next be described. FIG. 5 is a sequence chart illustrating an outline of the group key update process. The first node apparatus 50 creates the new group key and the group key distribution inhibition list indicating the node identification information of the distribution inhibition node, in accordance with a predetermined updating condition. Here, the third node apparatus 70b is supposed to be the distribution inhibition node. Therefore, the first node apparatus 50 creates the group key distribution inhibition list indicating the node identification information of the third node apparatus 70b.

Since the second node apparatuses 60a and 60b, which are the child nodes of the first node apparatus 50, are not the distribution inhibition nodes, the first node apparatus 50 creates the group key update message for the second node apparatuses 60a and 60b respectively. Specifically, the first node apparatus 50 encrypts the group key by using the encryption key assigned to the second node apparatuses 60a and 60b, and creates the group key update message including the encrypted group key, which is the group key that is encrypted, and the group key distribution inhibition list. The first node apparatus 50 transmits the group key update message, which is created for the second node apparatus 60a, to the second node apparatus 60a (step S1), and transmits the group key update message, which is created for the second node apparatus 60b, to the second node apparatus 60b with a unicast with the transmission confirmation (step S2).

When receiving the group key update message transmitted from the first node apparatus 50, the second node apparatus 60a acquires the encrypted group key and the group key distribution inhibition list included in the group key update message, and decrypts the encrypted group key by using the encryption key assigned to the second node apparatus 60a so as to obtain the group key. The second node apparatus 60a refers to the node identification information indicated by the group key distribution inhibition list so as to determine that the third node apparatus 70b of the third node apparatuses 70a and 70b that are the child nodes of the second node apparatus 60a is the distribution inhibition node, whereby it determines not to create and transmit the group key update message to the third node apparatus 70b. Then, the second node apparatus 60a encrypts the group key by using the encryption key assigned to the third node apparatus 70a, which is the child node, other than the distribution inhibition node, of the child nodes of the second node apparatus 60a, and creates the group key update message including the encrypted group key, which is the group key that is encrypted, and the group key distribution inhibition list. The second node apparatus 60a transmits the group key update message, which is created for the third node apparatus 70a, with the unicast with the transmission confirmation (step S3). When receiving the group key update message transmitted from the first node apparatus 50, the second node apparatus 60b refers to the node identification information indicated by the group key distribution inhibition list as in the second node apparatus 60a. In this case, the second node apparatus 60b determines that the third node apparatus 70c, which is the child node of the second node apparatus 60b, is not the distribution inhibition node, whereby it encrypts the group key by using the encryption key assigned to the third node apparatus 70c, and creates the group key update message including the encrypted group key, which is the group key that is encrypted, and the group key distribution inhibition list. The second node apparatus 60b then transmits the group key update message, which is created for the third node apparatus 70c, with the unicast with the transmission confirmation (step S4).

When receiving the group key update message transmitted from the second node apparatus 60a that is the parent node, the third node apparatus 70a transmits the transmission confirmation message, indicating the reception of the group key update message, to the second node apparatus 60a, since the third node apparatus 70a does not have the own child node (step S5). When receiving the group key update message transmitted from the second node apparatus 60b that is the parent node, the third node apparatus 70c transmits the transmission confirmation message, indicating the reception of the group key update message, to the second node apparatus 60b as in the third node apparatus 70a, since the third node apparatus 70c does not have the own child node (step S6).

When receiving the transmission confirmation message transmitted from the third node apparatus 70a, the second node apparatus 60a transmits the transmission confirmation message to the first node apparatus 50 that is the parent node (step S7). When receiving the transmission confirmation message transmitted from the third node apparatus 70c, the second node apparatus 60b transmits the transmission confirmation message to the first node apparatus 50 that is the parent node, as in the second node apparatus 60a (step S8).

When receiving the transmission confirmation message transmitted from the second node apparatus 60a and the second node apparatus 60b, the first node apparatus 50 simultaneously transmits the group key update completion message, which indicates that the group key is usable, to all node apparatuses connected to the network (step S9), in order to validate the group key. The simultaneous transmission may be made with broadcast or multicast.

When receiving the group key update completion message, the second node apparatuses 60a and 60b, and the third node apparatuses 70a and 70c validate the group key acquired from the group key update message received from the corresponding parent node. As described above, the group key is updated.

The detail of the process executed by the first node apparatus 50 in the group key update process described above will be described with reference to FIG. 6. As described above, the first node apparatus 50 creates the new group key and a group key distribution inhibition list P indicating the node identification information of the distribution inhibition node according to the predetermined updating condition (step S20). It is supposed here that the list indicating the node identification information of the child nodes of the first node apparatus 50 is defined as L, a list of node identification information of the child nodes, from which the transmission confirmation message with respect to the group key update message is supposed to be received, is defined as T, an initial value of T is defined as "null", a group key update completion message transmission flag indicating whether the group key update completion message can be transmitted or not is defined as S, and the value of S is defined as "false".

Figure 6:
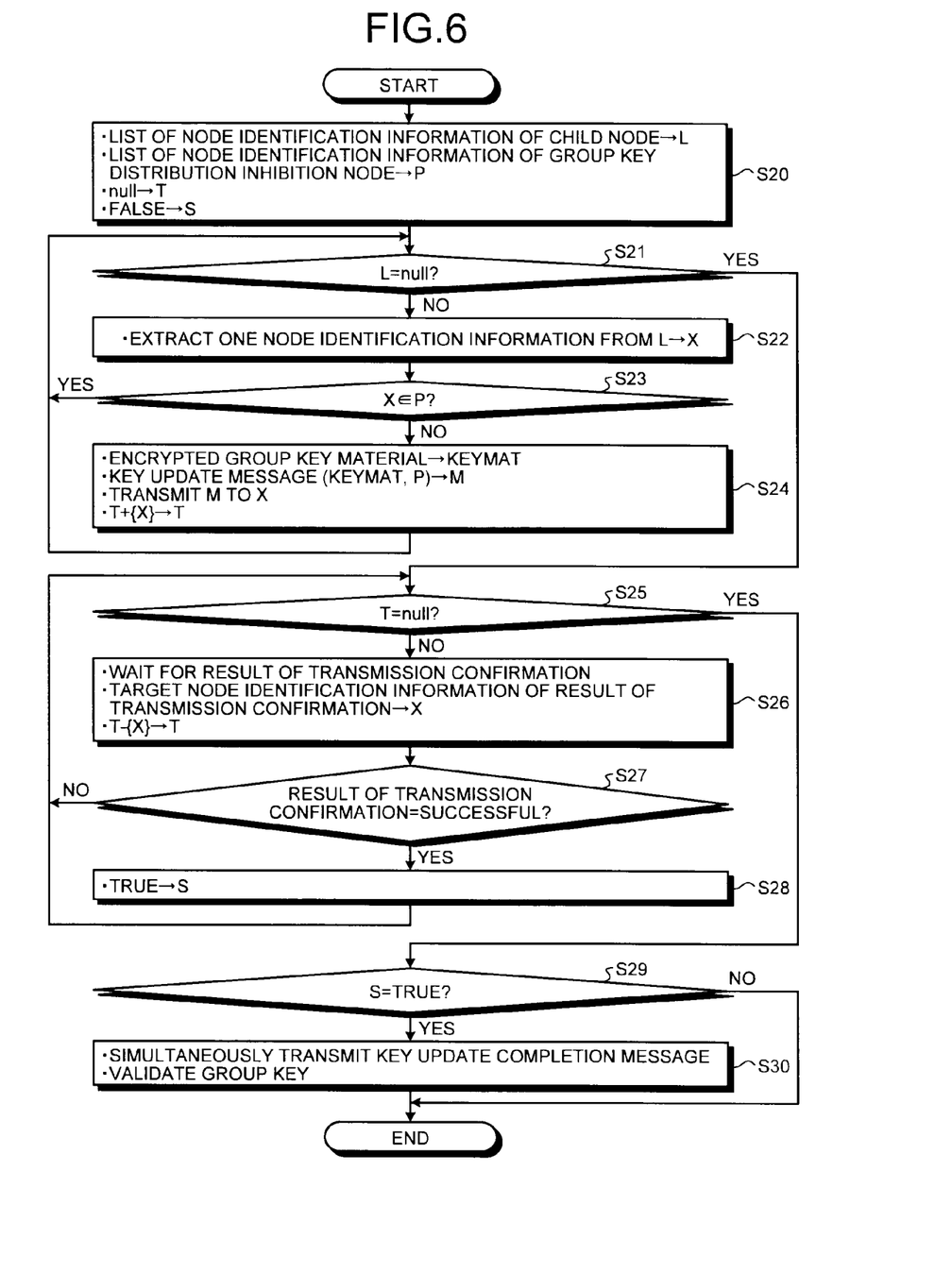
FIG. 6 is a flowchart illustrating a procedure of the process executed by the first node apparatus.

The first node apparatus 50 then determines whether the condition of "L is empty" is true or not (step S21). If this condition is true, the first node apparatus 50 proceeds to step S25, and if this condition is false, it proceeds to step S22. In step S22, the first node apparatus 50 extracts one of the non-extracted node identification information out of the node identification information indicated by L. The extracted one is defined as X. The first node apparatus 50 determines whether "X is represented by P" is true or not (step S23). If this condition is true, the first node apparatus 50 returns to step S21, and if this condition is false, it proceeds to step S24. In step S24, the first node apparatus 50 encrypts the group key by using the encryption key assigned to the node apparatus (here, either one of the second node apparatuses 60a and 60b) corresponding to X, creates a group key update message M including an encrypted group key KEYMAT, which is the group key that is encrypted, and P, transmits the resultant to the node apparatus corresponding to X, and adds X to T.

In step S25, the first node apparatus 50 determines whether the condition of "T is empty" is true or not. If this condition is true, the first node apparatus 50 proceeds to step S29, and if this condition is false, it proceeds to step S26. In step S26, the first node apparatus 50 waits for the reception of the transmission confirmation message with respect to the group key update message transmitted in step S24, wherein the first node apparatus 50 specifies the node identification information of the child node, which is the subject that the first node apparatus 50 waits for receiving the transmission confirmation message, as X, and deletes X from T. Then, the first node apparatus 50 determines whether the condition of "the transmission confirmation message is received", i.e., the condition of "the result of the transmission confirmation is successful", is true or not (step S27). If this condition is true, the first node apparatus 50 proceeds to step S28, and if this condition is false, it returns to step S25. In step S28, the first node apparatus 50 specifies S as true, and then, returns to step S25.

In step S29, the first node apparatus 50 determines whether the condition of "S is true" is true or not. If this condition is true, the first node apparatus 50 proceeds to step S30, and if this condition is false, the first node apparatus 50 ends the process. In step S30, the first node apparatus 50 simultaneously transmits the key update completion message to all node apparatuses connected to the network so as to validate the group key, and then, ends the process.

Figure 7:
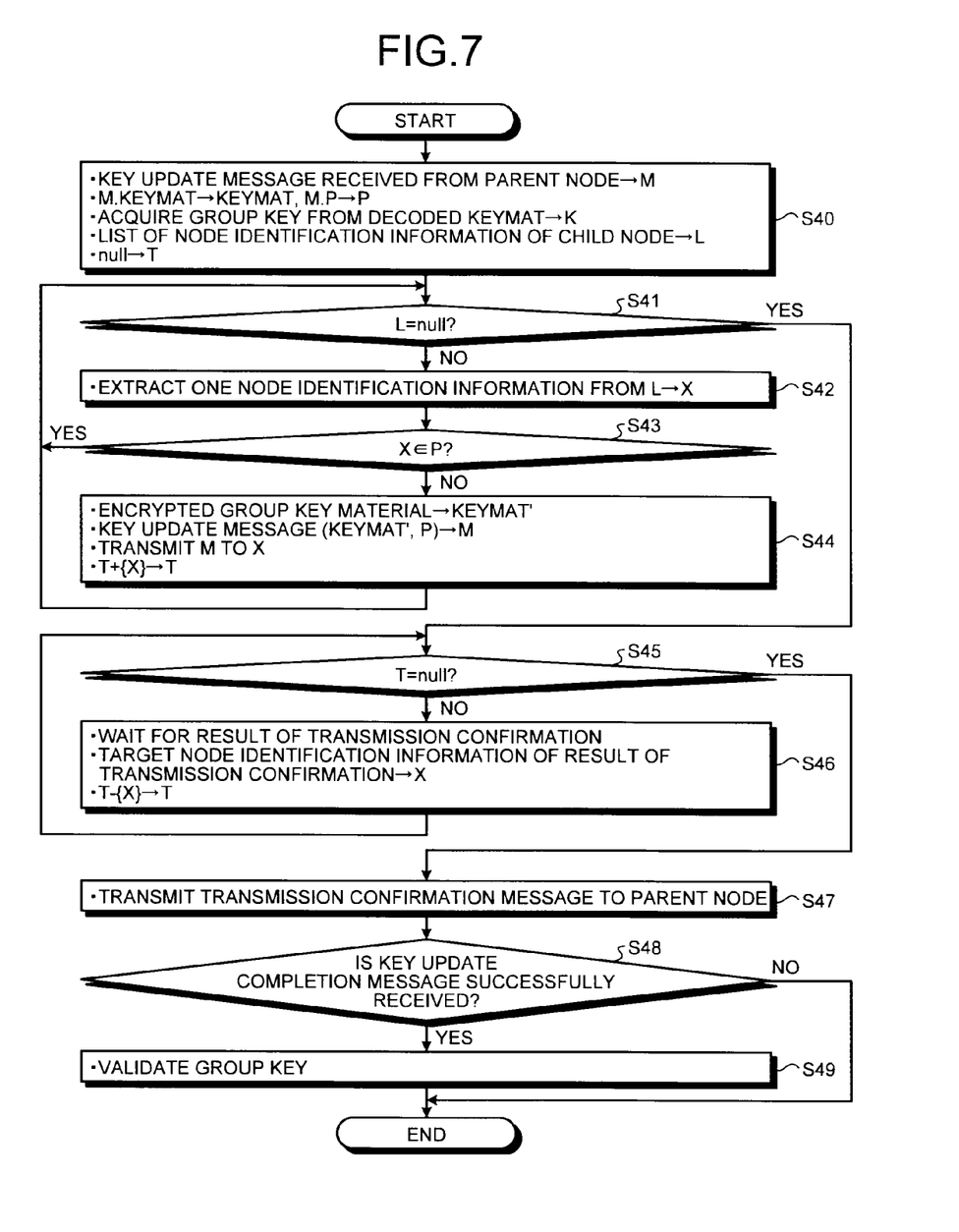
FIG. 7 is a flowchart illustrating a procedure of the process executed by the non-first node apparatus.

The detail of the process executed by the non-first node apparatus during the above-mentioned group key updating process will be described with reference to FIG. 7. As described above, when receiving the group key update message M from the parent node, the non-first node apparatus acquires the encrypted group key and the group key distribution inhibition list P included in the group key update message, and decrypts the encrypted group key KEYMAT by using the encryption key assigned to the non-first node apparatus so as to obtain a group key K (step S40). It is supposed here that the list indicating the node identification information of the child nodes of the non-first node apparatus is defined as L, the node identification information of the child nodes, from which the transmission confirmation message with respect to the group key update completion message is supposed to be received, is defined as T, and an initial value of T is defined as "null".

Then, the non-first node apparatus determines whether the condition of "L is empty" is true or not (step S41). If this condition is true, the non-first node apparatus proceeds to step S45, and if this condition is false, it proceeds to step S42. In step S42, the non-first node apparatus extracts one of the non-extracted node identification information out of the node identification information indicated by L. The extracted one is defined as X. The first node apparatus 50 determines whether the condition of "X is represented by P" is true or not (step S43). If this condition is true, the first node apparatus 50 returns to step S41, and if this condition is false, it proceeds to step S44. In step S44, the first node apparatus 50 encrypts the group key by using the encryption key assigned to the node apparatus corresponding to X, creates a group key update message M including the encrypted group key KEYMAT' and P, transmits the resultant to the node apparatus corresponding to X, and adds X to T.

In step S45, the non-first node apparatus determines whether the condition of "T is empty" is true or not. If this condition is true, the non-first node apparatus proceeds to step S47, and if this condition is false, it proceeds to step S46. In step S46, the non-first node apparatus waits for the reception of the transmission confirmation message with respect to the group key update message transmitted in step S44, wherein the non-first node apparatus specifies the node identification information of the child node, which is the subject that the non-first node apparatus waits for receiving the transmission confirmation message, as X, and deletes X from T. In step S47, the non-first node apparatus transmits the transmission confirmation message to the parent node. Thereafter, the non-first node apparatus determines whether the reception of the key update completion message transmitted from the first node apparatus 50 is successful or not (step S48). If the determination result is yes, the non-first node apparatus proceeds to step S49, and if the determination result is no, it ends the process. In step S49, the non-first node apparatus validates the group key, and then, ends the process.

As described above, in a network forming a directed acyclic graph topology with plural nodes, including one node serving as a root node and having a parent-child relationship among the nodes of the adjacent hierarchies, a group key update message including a new encrypted group key and a key update inhibition node list is sequentially transmitted in the order from the root node of the network to the lower hierarchies among the node apparatuses having the parent-child relationship, with a unicast with a transmission confirmation, when a group key is updated. Thus, the number of the group key update massages transmitted by the respective node apparatuses does not depend upon the hierarchy in which the corresponding node apparatus is present, and further, the total number of the group key update messages received and transmitted in the network can be reduced. The group key can be updated in a network having low reliability in broadcast or multicast.

In the above-mentioned embodiment, various programs executed by each of the node apparatuses may be stored on a computer connected to the network such as the Internet, and may be provided through the download via the network. The various programs may also be recorded on a computer-readable recording medium, such as a CD-ROM, flexible disk (FD), CD-R, or DVD (Digital Versatile Disk), in a file of an installable format or executable format, so as to be provided as a computer program product.

In the above-mentioned embodiment, the node apparatus may be incorporated into an electric power meter, an electric automobile, sensor, home electronics, storage battery, solar power generation device, or energy devices such as HEMS (Home Energy Management System), BEMS (Building EMS), and CEMS (Community EMS).

In the above-mentioned embodiment, when the child node is dormant, the node apparatus may discontinue the transmission of the group key update message until the child node becomes normal. In this case, when receiving a certain packet (e.g., Data Request MAC frame of IEEE 802.15.4) from the child node, the node apparatus may regard that the child node is returned to a normal state, and transmit the group key update message to the child node.

In the above-mentioned embodiment, the first node apparatus 50 may transmit again the group key update message at a predetermined time interval, after transmitting the group key update message to the child nodes, other than the distribution inhibition node, out of the child nodes of the first node apparatus 50. Even in case where the first node apparatus 50 succeeds in or fails in receiving the transmission confirmation message from the corresponding child node, i.e., according to the result of the reception of the transmission confirmation message from the corresponding child node, the first node apparatus 50 may simultaneously transmit the group key update completion message so as to validate the group key.

The non-first node apparatus may transmit again the group key update message at a predetermined time interval, after transmitting the group key update message to the child nodes, other than the distribution inhibition node, out of the own child nodes. Even in case where the non-first node apparatus succeeds in or fails in receiving the transmission confirmation message from the corresponding child node, i.e., according to the result of the reception of the transmission confirmation message from the corresponding child node, the non-first node apparatus may transmit the transmission confirmation message to the own parent node.

When the non-first node apparatus fails in receiving the group key update message, or succeeds in receiving the group key update message but fails in receiving the group key update completion message, the non-first node apparatus may acquire the group key that is updated by using the group key distribution method described in JP-A 2010-108520 (KO-KAI).

In the above-mentioned embodiment, a directed acyclic graph topology with plural nodes, including one node serving as a root node and having a parent-child relationship among the nodes of the adjacent hierarchies, may be formed based upon the topology information created by a routing protocol. For example, the directed acyclic graph topology may be formed based upon the information of DODAG (Destination Oriented Directed Acyclic Graph) created by RPL (IPv6 Routing Protocol for Low power and Lossy Networks) specified in the reference document 1.

(Reference Document 1) http://tools.ietf.org/html/draft-ietf-roll-rpl-15

In the above-mentioned embodiment, when the child node has plural parent nodes, the child node selects one parent node (hereinafter referred to as a representative parent node) among the plural parent nodes. When the child node receives the group key update message from the representative parent node, as in the above-mentioned embodiment, it creates the group key update message and transmits the resultant to the child nodes, other than the distribution inhibition node, out of the own child nodes, and when the child node receives the transmission confirmation message from the corresponding child node, it transmits the transmission confirmation message to the representative parent node. On the other hand, when the child node having plural parent nodes receives the group key update message from the parent node other than the representative parent node, it operates as if it has no own child nodes. In other words, the child node does not decrypts the encrypted group key included in the group key update message received from the parent node other than the representative parent node, so that it does not create and transmit the group key update message to the own child nodes.

In the above-mentioned embodiment, the encryption key used for encrypting the group key is not limited to those in the above-mentioned examples. For example, a public key assigned to the child nodes may be used as the encryption key. A shared key shared only by the child nodes and the parent node may be used as the encryption key.

Figure 8:
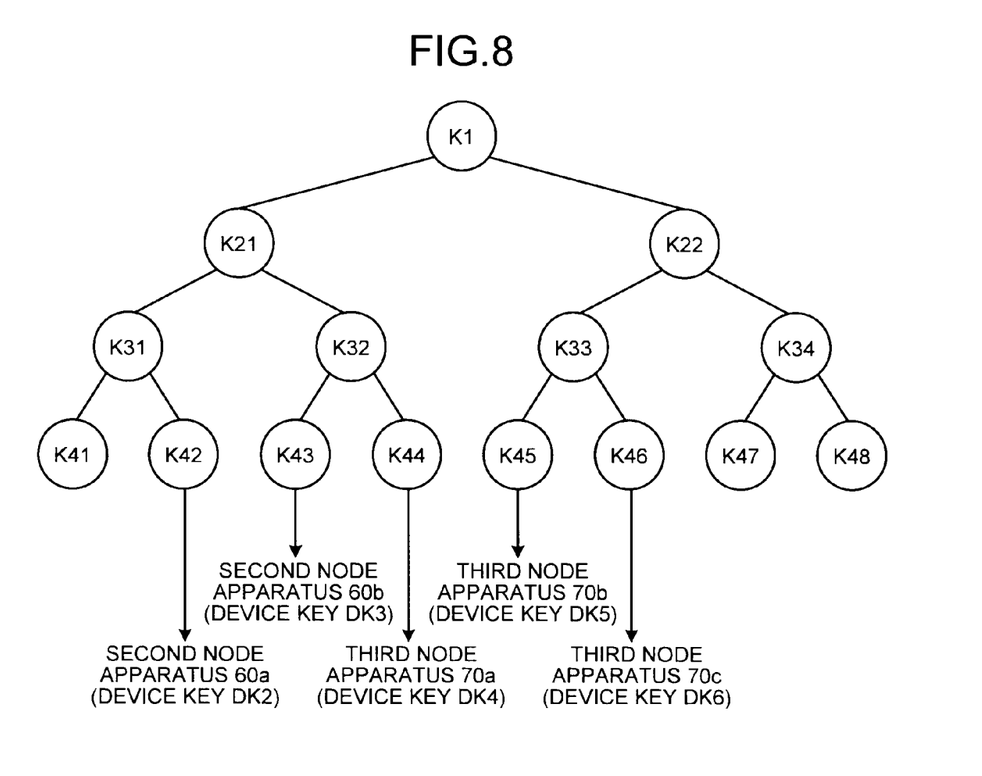
FIG. 8 is a diagram illustrating a structure of an MKB and an assignment of device keys according to one modification.

An MKB (media key block) may be used as the encryption key. The MKB is created by the first node apparatus 50, for example, wherein a device key included in the MKB is assigned to each of the non-first node apparatuses. FIG. 8 is a diagram illustrating a structure of the MKB and the assignment of the device keys, serving as the encryption key, to the non-first node apparatuses according to a modification of the present embodiment. In the MKB illustrated in FIG. 8, plural device keys K1, K21, K22, K31 to K34, and K41 to K48 have one-dimensional tree structure. In this tree structure, the root node present in the uppermost hierarchy is the device key K1, and the leaf nodes present in the lowermost hierarchy is the device keys K41 to K48. Each of the non-first node apparatuses is assigned to each of the leaf nodes of the tree structure, and a set of device keys on a path from the root node to the leaf nodes in the tree structure is assigned to each of the non-first node apparatuses as the encryption key. For example, the device key "DK2=(K1, K21, K31, K42)" is assigned to the second node apparatus 60a, the device key "DK3=(K1, K21, K32, K43)" is assigned to the second node apparatus 60b, the device key "DK4=(K1, K21, K32, K44)" is assigned to the third node apparatus 70a, the device key "DK5=(K1, K22, K33, K45)" is assigned to the third node apparatus 70b, and the device key "DK6=(K1, K22, K33, K46)" is assigned to the third node apparatus 70c. In the structure described above, the first node apparatus 50 may set the encrypted group key included in the group key update message as a set of encrypted group keys obtained by encrypting the group key GK with the respective valid device keys assigned to the respective non-first node apparatus, i.e., as {E(GK, DK2), E(GK, DK3), E(GK, DK4), E(GK, DK5), E(GK, DK6)}. Here, E(m, y) is a value obtained by encrypting m with y. When the third node apparatus 70b is the distribution inhibition node, the device key DK5 of the third node apparatus 70b may be invalidated, as in the above-mentioned embodiment. In this case, the first node apparatus 50 may exclude the E(GK, DK5) from the encrypted group keys included in the group key update message. On the other hand, when receiving the group key update message from the own parent node, each of the non-first node apparatuses decrypts the encrypted group key by using the device key assigned thereto. When each of the non-first node apparatuses transmits the group key update message to the own child nodes, it may transmit the group key update message received from the own parent node, without encrypting the group key with the use of the device key, which is the encryption key, assigned to the corresponding child nodes.

Specifically, in the group key updating process in FIG. 5, the first node apparatus 50 transmits the group key update message, including the set of the encrypted group keys and the group key distribution inhibition list, to the second node apparatuses 60a and 60b, respectively, in steps S1 and S2. In step S3, when receiving the group key update message transmitted from the first node apparatus 50, the second node apparatus 60a acquires the set of the encrypted group keys and the group key distribution inhibition list included in the group key update message, decrypts the encrypted group keys (here, E(GK, DK2)) included in the set of the encrypted group keys by using the device key assigned to the second node apparatus 60a so as to obtain the group key. The second node apparatus 60a then transmits the group key update message, received from the first node apparatus 50, to the third node apparatus 70a. Step S4 is the same as step S3.

Even by the structure described above, in a network forming a directed acyclic graph topology with plural nodes, including one node serving as a root node and having a parent-child relationship among the nodes of the adjacent hierarchies, the number of the group key update messages, which are to be received or transmitted, can be reduced upon the update of the group key. Further, it becomes unnecessary for the non-first node apparatus to encrypt the group key, as well as for the non-first node apparatus to store the encryption key assigned to the own child nodes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A node that is a root node of a network forming a directed acyclic graph topology by plural nodes, the plural nodes including the node serving as the root node and having a parent-child relationship among nodes of adjacent hierarchies, the node comprising:
   a generating unit, implemented by processing circuitry, that generates a group key and a list indicating a specific node to which a distribution of the group key is inhibited;
   an encrypting unit that encrypts the group key to obtain an encrypted group key; and
   a transmitting unit that transmits, to the first child node, a first message including the encrypted group key and the list,
   wherein the encrypted group key is decryptable by a first child node of the root node, the first child node being a node other than the specific node,
   wherein the encrypting unit encrypts the group key using a shared key shared only between the root node and the first child node, and
   wherein after receipt of the first message including the encrypted group key and the list by the first child node, the list is accessed by the first child node in order to identify any nodes for which distribution of the group key is inhibited.

2. The node according to claim 1, further comprising a receiving unit that receives a second message, indicating that the first message is received, from the first child node,
   wherein the transmitting unit re-transmits the first message, transmitted to the first child node, at a predetermined time interval, and transmits to the plural nodes a third message indicating that the group key is usable, according to the result of the reception of the second message from the first child node with respect to the first message.

3. The node according to claim 1, wherein the encrypting unit encrypts the group key by using a public key assigned to the first child node.

4. The node according to claim 1, wherein the encrypting unit encrypts the group key by using a Media Key Block.

5. A node that is a second node other than a root node of a network forming a directed acyclic graph topology, which is composed of plural nodes including the node serving as the root node and having a parent-child relationship among nodes of adjacent hierarchies, the node comprising:
   a receiving unit that receives a first message including a first encrypted group key, and a list indicating a specific node to which a distribution of a group key is inhibited, from a parent node of the second node;
   a decrypting unit that decrypts the first encrypted group key to obtain the group key;
   an encrypting unit, implemented by processing circuitry, that encrypts the decrypted group key to obtain a second encrypted group key; and
   a transmitting unit that transmits, to a first child node of the second node other than the specific node, a second message including the second encrypted group key and the list,
   wherein the second encrypted group key is decryptable by the first child node of the second node,
   wherein the encrypting unit encrypts the group key using a shared key shared only between a first child node of the root node and the second node, and
   wherein after receipt of the first message including the first encrypted group key and the list, the list is accessed by the second node in order to identify any nodes for which distribution of the group key is inhibited.

6. The node according to claim 5, wherein, when a child node of the second node or the first child node is not present, the transmitting unit transmits a third message indicating the reception of the first message to a parent node.

7. The node according to claim 6, wherein the receiving unit receives a fourth message indicating the reception of the second message from the first child node, when the first child node is present, and
   when the first child node is present, the transmitting unit re-transmits the second message, transmitted to the first child node, at a predetermined time interval, and transmits the third message to the parent node according to the result of the reception of the fourth message transmitted from the first child node.

8. The node according to claim 5, wherein the receiving unit receives a fifth message, which is transmitted from the root node and indicates that the group key is usable, and the second node further comprises a validating unit that validates the group key, when the fifth message is received.

9. The node according to claim 5, further comprising a selecting unit that, when there are plural parent nodes, selects a first parent node from the plural parent nodes, wherein the decrypting unit does not decrypt the first encrypted group key, included in the first message received from a second parent node other than the first parent node out of the plural parent nodes.

10. A group key updating method in a network forming a directed acyclic graph topology with plural nodes, including one node serving as a root node and having a parent-child relationship among the nodes of the adjacent hierarchies, wherein the root node:

generates, using processing circuitry, a group key and a list indicating a specific node, to which a distribution of the group key is inhibited;

encrypts the group key to obtain a first encrypted group key; and transmits, to a first child node, a first message including the first encrypted group key and the list, wherein the first encrypted group key is decryptable by the first child node of the root node, the first child node being a node other than the specific node, and wherein the first child node other than the root node:

receives the first message including the first encrypted group key and the list indicating the specific node to which the distribution of the group key is inhibited, from the root node which is a parent node of the first child node;

decrypts the first encrypted group key to obtain the group key;

encrypts the decrypted group key to obtain a second encrypted group key; and transmits, to a second child node, a second message including the second encrypted group key and the list, wherein the second encrypted group key is a group key decryptable by the second child node, wherein the first encrypted group key is encrypted using a first shared key shared only between the first child node and the root node, wherein the second encrypted group key is encrypted using a second shared key shared only between the second child node and the first child node, and wherein after receipt of the first message including the encrypted group key and the list by the first child node, the list is accessed by the first child node in order to identify any nodes for which distribution of the group key is inhibited.

11. The group key updating method according to claim 10, wherein the root node re-transmits the first message, transmitted to the first child node, at a predetermined time interval.

12. A node that is a second node other than a root node of a network forming a directed acyclic graph topology by plural nodes, the plural nodes including the node serving as the root node and having a parent-child relationship among nodes of adjacent hierarchies, the node comprising:

a receiving unit that receives a first message including an encrypted group key encrypted using Media Key Block, and a list indicating a specific node to which a distribution of a group key is inhibited, from a parent node of the second node;

a decrypting unit, implemented by circuitry, that decrypts the encrypted group key to obtain the group key;

a transmitting unit that transmits, to a first child node, a second message including the encrypted group key and the list;

wherein the decrypting unit decrypts the encrypted group key using a shared key shared only between the parent node and the second node, and wherein after receipt of the first message including the encrypted group key and the list by the second node, the list is accessed by the second node in order to identify any nodes for which distribution of the group key is inhibited.

* * * * *